United States Patent
Mostert et al.

(10) Patent No.: US 8,033,555 B2
(45) Date of Patent: Oct. 11, 2011

(54) ASSEMBLY COMPRISING A CHASSIS AND A CHILD SEAT BEING DETACHABLY CONNECTABLE TO THE CHASSIS, SUCH A CHASSIS AS WELL AS SUCH A CHILD SEAT

(75) Inventors: Marc Mostert, Sittard (NL); Paulus Adrianus Jacobus Van Diepen, The Hague (NL)

(73) Assignee: Cosco Management, Inc., Wilmington, DE (US)

( * ) Notice: Subject to any disclaimer, the term of this patent is extended or adjusted under 35 U.S.C. 154(b) by 301 days.

(21) Appl. No.: 12/420,626

(22) Filed: Apr. 8, 2009

(65) Prior Publication Data

US 2009/0256323 A1 Oct. 15, 2009

(30) Foreign Application Priority Data

Apr. 9, 2008 (NL) ..................................... 1035275

(51) Int. Cl.
 *B62B 7/00* (2006.01)
 *A47C 1/08* (2006.01)
(52) U.S. Cl. ................. 280/47.38; 297/256.16
(58) Field of Classification Search ............. 280/47.38; 297/256.16
 See application file for complete search history.

(56) References Cited

U.S. PATENT DOCUMENTS

| | | | | |
|---|---|---|---|---|
| 6,237,995 B1 * | 5/2001 | Dierickx | ...................... | 297/130 |
| 6,793,280 B2 * | 9/2004 | Washizuka et al. | ............ | 297/130 |
| 6,942,294 B2 * | 9/2005 | Takamizu | ................ | 297/256.16 |
| 7,017,921 B2 * | 3/2006 | Eros | ............................ | 280/47.38 |
| 7,658,399 B2 * | 2/2010 | Van Dijk | ....................... | 280/642 |
| 2002/0063450 A1 * | 5/2002 | Washizuka et al. | ........... | 297/130 |
| 2003/0015895 A1 * | 1/2003 | Hou | .............................. | 297/130 |
| 2004/0207242 A1 * | 10/2004 | Takamizu | ................ | 297/256.16 |
| 2005/0184564 A1 * | 8/2005 | Takamizu et al. | ............. | 297/130 |

FOREIGN PATENT DOCUMENTS

| | | |
|---|---|---|
| DE | 20 2005 008 211 | 11/2005 |
| EP | 1211124 | 6/2002 |
| EP | 1470986 | 10/2004 |

OTHER PUBLICATIONS

European Search Report dated Jan. 22, 2009, for Netherlands Application NL 1035275.

* cited by examiner

*Primary Examiner* — J. Allen Shriver, II
*Assistant Examiner* — James M Dolak
(74) *Attorney, Agent, or Firm* — Barnes & Thornburg LLP

(57) ABSTRACT

The assembly comprises a chassis and a child seat being detachably connectable to the chassis. The child seat is provided with at least one first connecting element, which is detachably connectable to a second connecting element provided in the chassis. The connecting elements are provided with a locking mechanism for interlocking the connecting elements. The locking mechanism can be unlocked for subsequently disconnecting the connecting elements from each other. The locking mechanism can be locked in a blocking position, in which position the locking mechanism is unlocked.

18 Claims, 5 Drawing Sheets

ASSEMBLY COMPRISING A CHASSIS AND A CHILD SEAT BEING DETACHABLY CONNECTABLE TO THE CHASSIS, SUCH A CHASSIS AS WELL AS SUCH A CHILD SEAT

Assembly comprising a chassis and a child seat being detachably connectable to the chassis, such a chassis as well as such a child seat.

The invention relates to an assembly comprising a chassis and a child seat being detachably connectable to the chassis, which child seat is provided with at least one first connecting element, which is detachably connectable to a second connecting element provided in the chassis, said connecting elements being provided with a locking mechanism for interlocking the connecting elements, which locking mechanism can be unlocked for subsequently disconnecting the connecting elements from each other.

The invention also relates to a chassis and a child seat suitable for such an assembly.

In such an assembly, which is known from German utility model DE-U1-20.2005.008.211, a child seat is provided with two pin-shaped elements, which can each be positioned in tubular elements connected to the chassis. The tubular element is provided with a cam which is movable against spring force, which cam can be brought into engagement with a recess formed in said pin-shaped element for locking the child seat in position relative to the chassis.

As a result of said locking engagement of the child seat, the child seat is securely connected to the chassis. The chassis used in said German utility model is a stroller.

When a user wishes to remove the child seat from the stroller, the cams present on either side of the stroller must be simultaneously moved out of engagement with the recesses against spring force, after which the pin-shaped elements of the child seat can be lifted from the tubular elements. In order to do so, a user needs three hands, as it were, two for releasing the locking engagement on either side and one for lifting the child seat from the chassis.

Removing the child seat from the chassis is thus a comparatively complex operation.

The object of the invention is to provide an assembly which enables a user to remove the child seat from the chassis in a simple manner.

This object is accomplished with the assembly according to the invention in that the locking mechanism can be locked in a blocking position, in which position the locking mechanism is unlocked.

A user can move the locking mechanism to the blocking position with one hand, after which the child seat is still connected to the chassis but no longer interlocked with the chassis. The user will then no longer need that hand for holding the locking mechanism in the unlocked position, since the locking mechanism is in the blocking position. In other words, an external force is no longer needed for holding the locking mechanism in the unlocked position. After the locking mechanism has been unlocked and moved to the blocking position, the user has both hands available for disconnecting the child seat from the chassis.

In this way the serviceability of the assembly is enhanced. In addition, the safety of a child seated in the child seat is enhanced, since the user has both hands available for taking hold of the child seat. Furthermore, a user can unlock and disconnect the child seat from the chassis with one hand, if desired.

One embodiment of the assembly according to the invention is characterised in that the child seat is provided with first connecting elements located on two longitudinal sides, whilst the chassis is provided with two spaced-apart second connecting elements, which can be connected to said first connecting elements, and the locking mechanisms can be locked in the blocking positions in succession.

By using connecting elements provided on both longitudinal sides of the child seat, a secure connection with the chassis is obtained. Since the locking mechanisms can be moved to the blocking position in succession, a user can hold the child seat with one hand, whilst the user unlocks and blocks the locking mechanisms in succession with the other hand.

This enhances the safety of the child seated in the child seat.

Another embodiment of the assembly according to the invention is characterised in that the first connecting element is provided with a pivot arm, which comprises at least a first and a second hook-shaped element, which elements mate with a first and a second pawl of the second connecting element, whilst the first hook-shaped element is connectable to the first pawl for locking the pivot arm in position and the second hook-shaped element is connectable to the second pawl for locking the pivot arm in the blocking position.

In this way connecting, locking, unlocking and blocking are realised in a simple manner.

Yet another embodiment of the assembly according to the invention is characterised in that the second pawl comprises a part that extends conically from the first pawl.

Such a pawl is comparatively easy to produce.

Another embodiment of the invention is characterised in that the pivot arm is pivotable about a substantially horizontally extending pivot axis for connecting the pivot arm to the first pawl, whilst it is also pivotable about a substantially vertically extending second pivot axis for moving the pivot arm to the blocking position.

Since the pivot arm is pivotable both about a substantially horizontally extending pivot axis and about a substantially vertically extending pivot axis, different kinds of movement of the pivot arm can be realised in a simple manner.

The invention will now be explained in more detail with reference to the drawing, in which.

Like parts are indicated by the same numerals in the figures.

Figure 1:
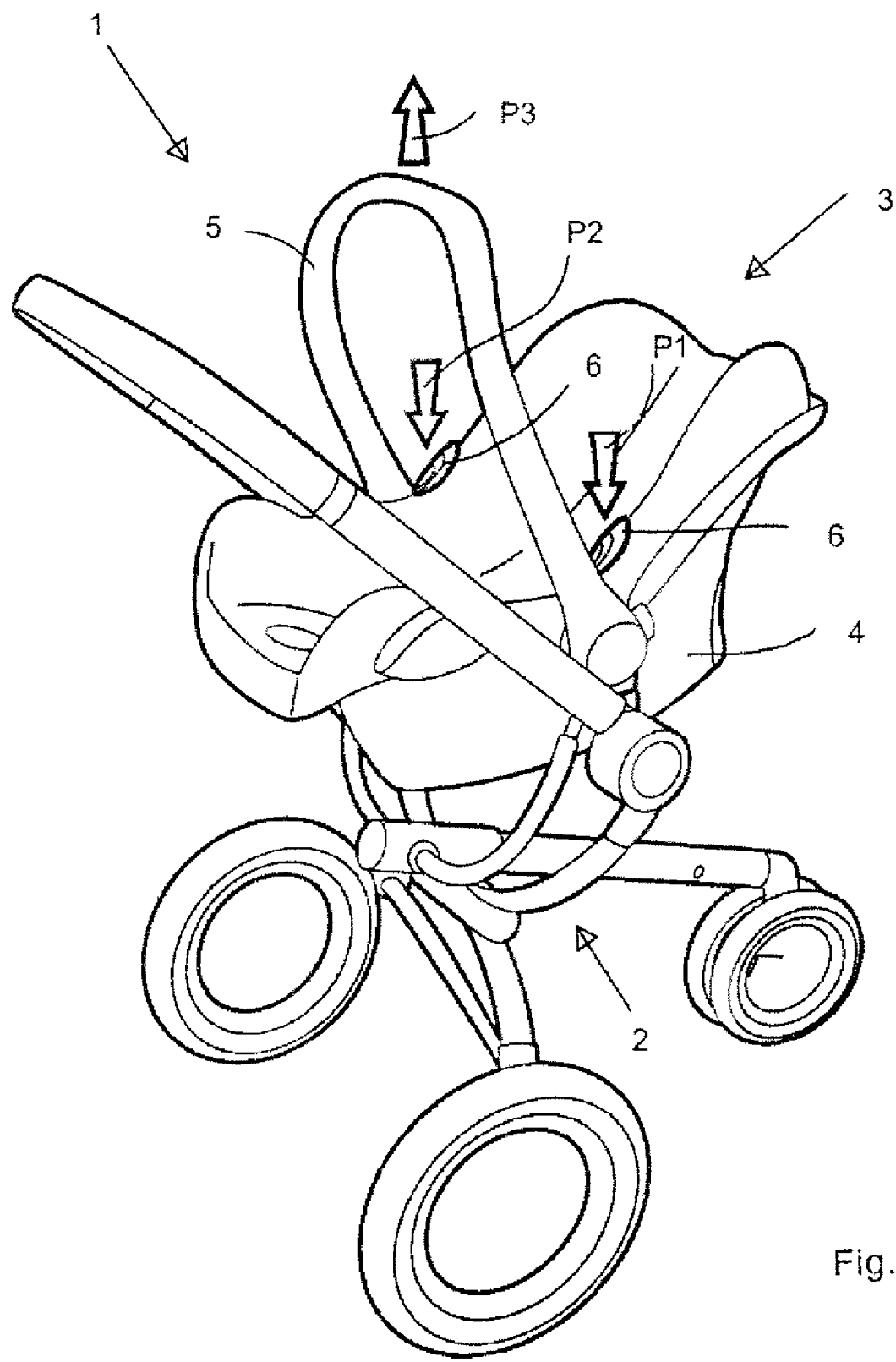
FIG. 1 is a perspective view of a child seat connected to a stroller.
Figure 2:
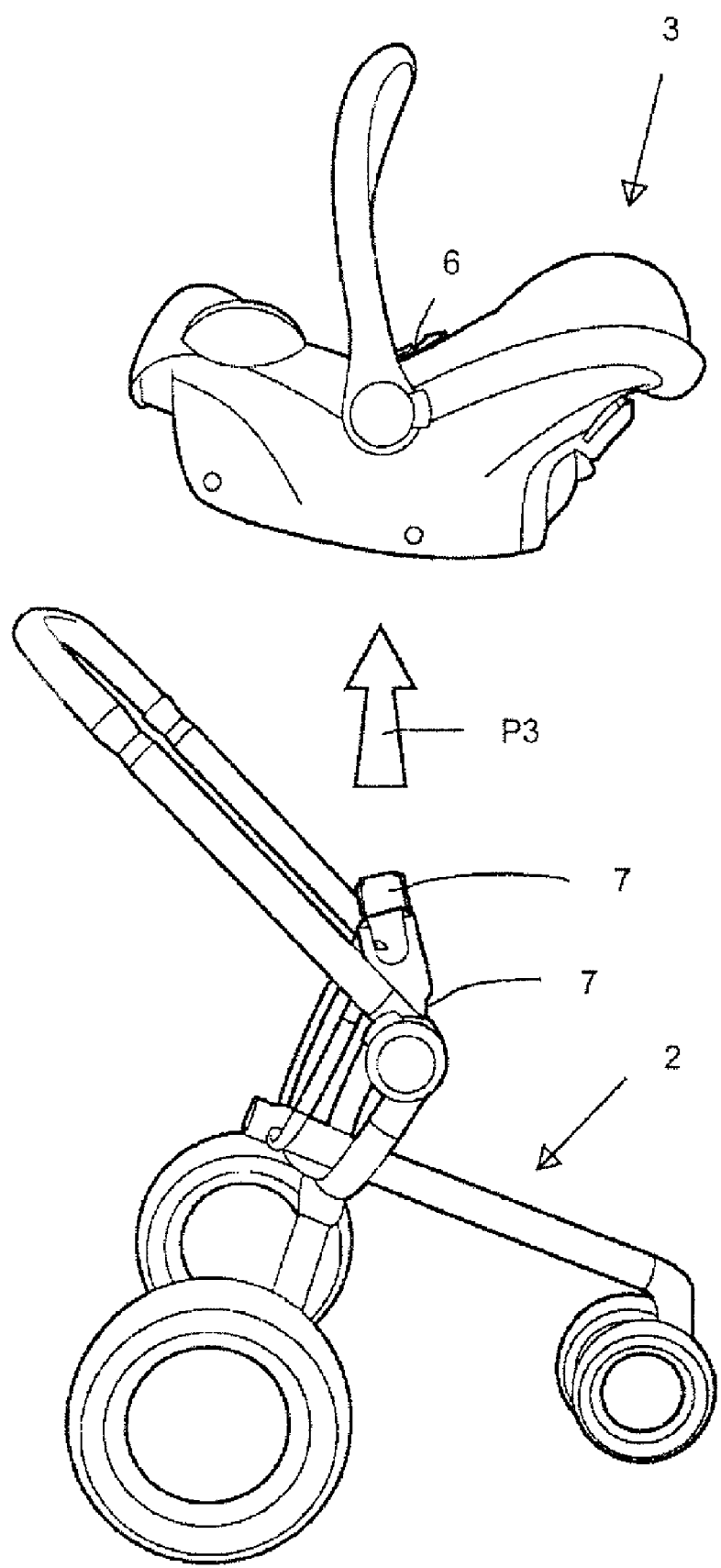
FIG. 2 is a perspective view of a child seat disconnected from the stroller.

FIGS. 1 and 2 show an assembly 1 according to the invention, which comprises a stroller 2 forming a chassis and a child seat 3 detachably connected to the stroller 2. The child seat 3 comprises a seat portion 4 and a carrying handle 5, which is connected to the seat portion 4 on either side of the seat portion 4. Such a child seat 3 is known per se and will not be explained in more detail herein, therefore. On both longitudinal sides, the child seat 3 is provided with first connecting elements 6, which mate with second connecting elements 7 provided in the stroller 2.

The first and second connecting elements 6, 7 and the operation thereof will be explained in more detail with reference FIGS. 3-7b.

Figure 3:
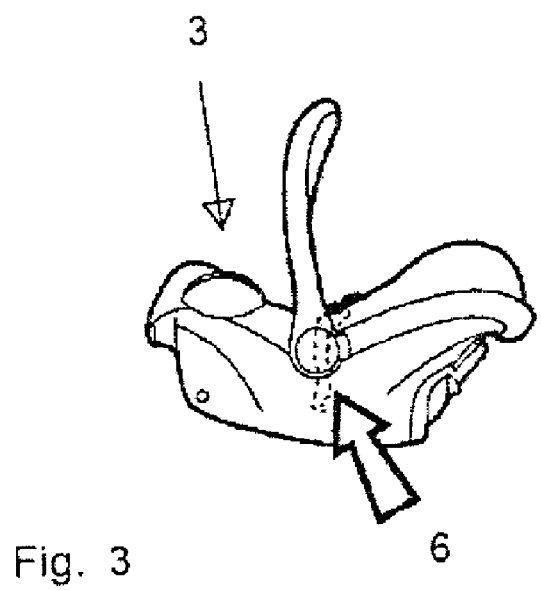
FIG. 3 is a side view of the child seat shown in FIG. 2.

FIG. 3 is a side view of the child seat 3 with the first connecting element 6 illustrated in dotted lines.

Figure 4:
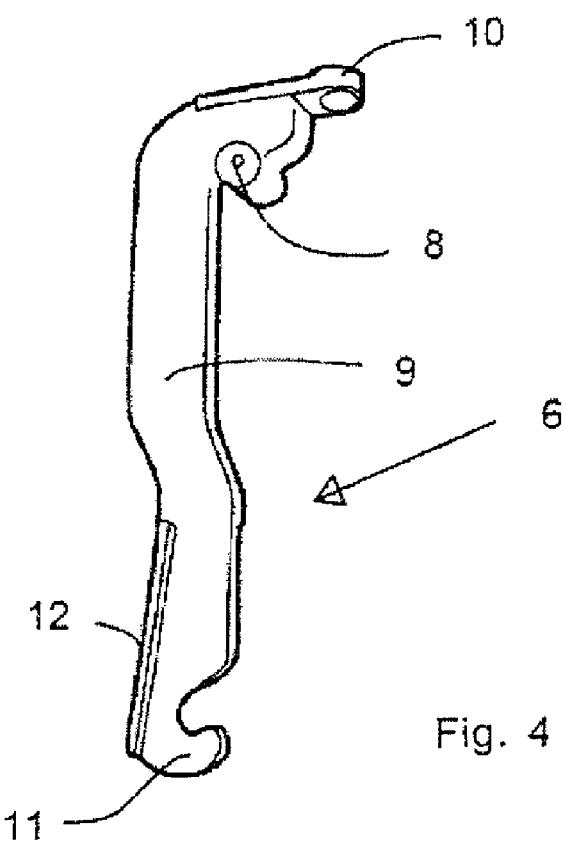
FIG. 4 is a larger-scale detail view of the pivot arm of the child seat of FIG. 3.

As FIG. 4 clearly shows, the first connecting element 6 comprises an elongated pivot arm 9 which is pivotable about a horizontally extending pivot axis 8, which pivot arm is provided, at a first end thereof, with a control knob 10, which can be operated on a side of the child seat 3 that faces the carrying handle 5. The pivot arm 9 is provided with a first hook-shaped element 11 at a second end located on a side remote from said first end and also with an elongated rib 12, which extends transversely to the pivot arm 9. The rib 12 forms a second hook-shaped element.

Figure 5A:
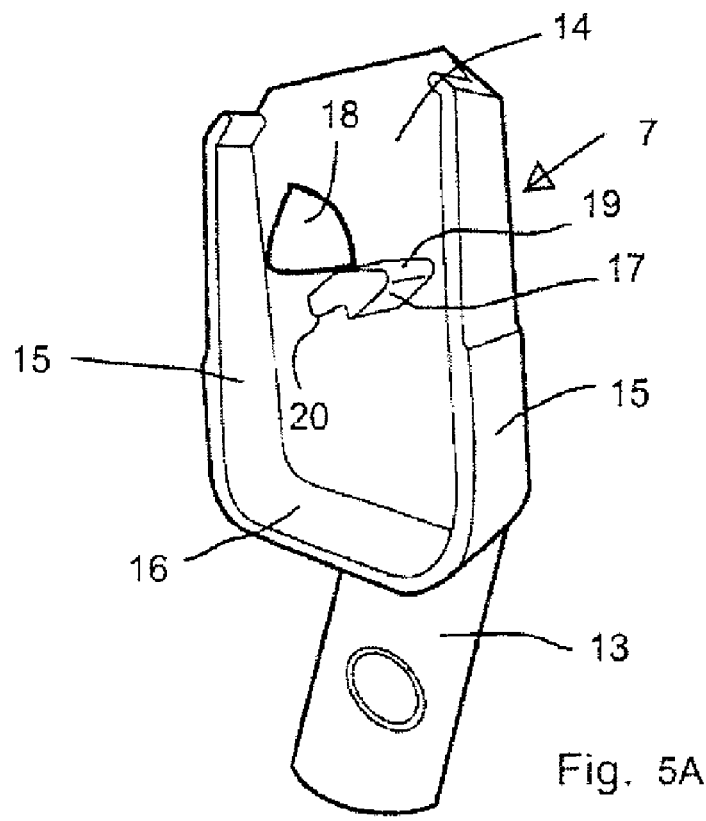
FIGS. 5a and 5b are a perspective side view and a perspective top plan view, respectively, of the second connecting element of the stroller shown in FIGS. 1 and 2.
Figure 5B:
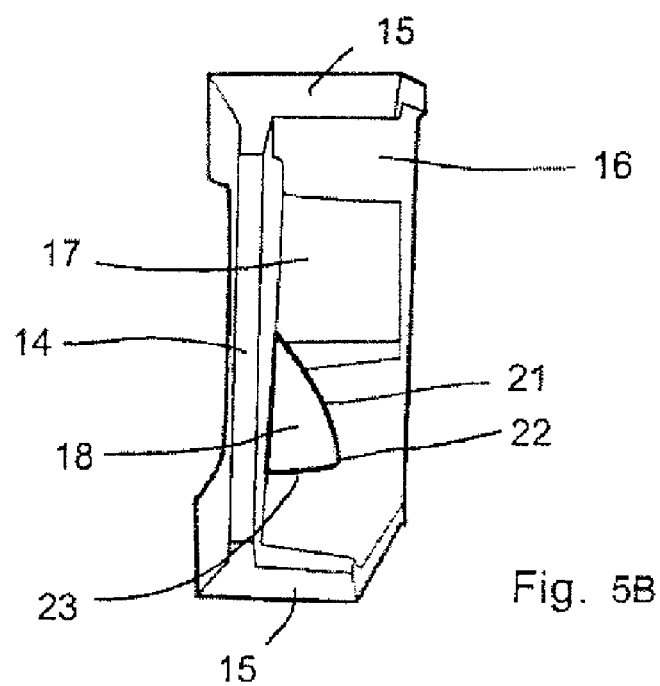
Figure 6A:
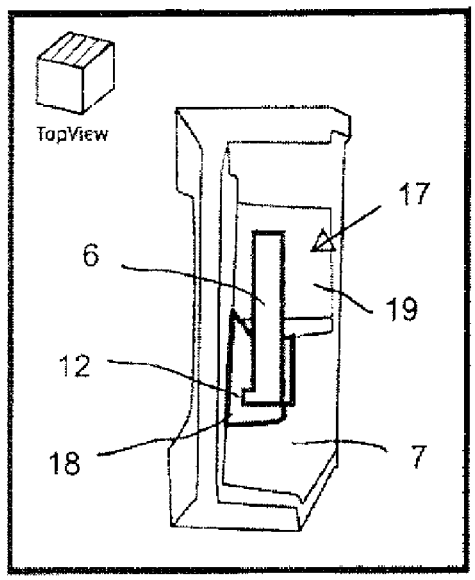
FIGS. 6a and 6b are a perspective top plan view and a perspective side view, respectively, of interlocked first and second connecting elements.
Figure 6B:
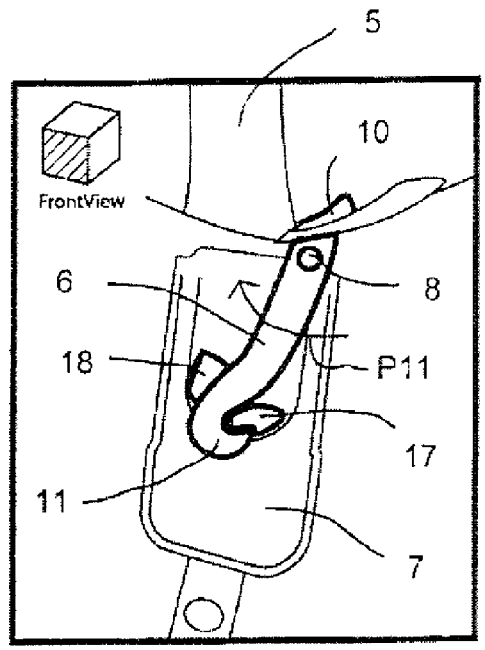
Figure 7A:
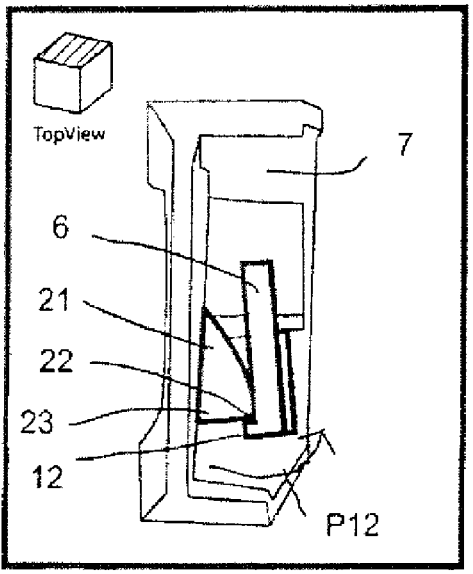
FIGS. 7a and 7b are a perspective top plan view and a perspective side view, respectively, of interconnected connecting elements, with the locking mechanism being locked in a blocking position.
Figure 7B:
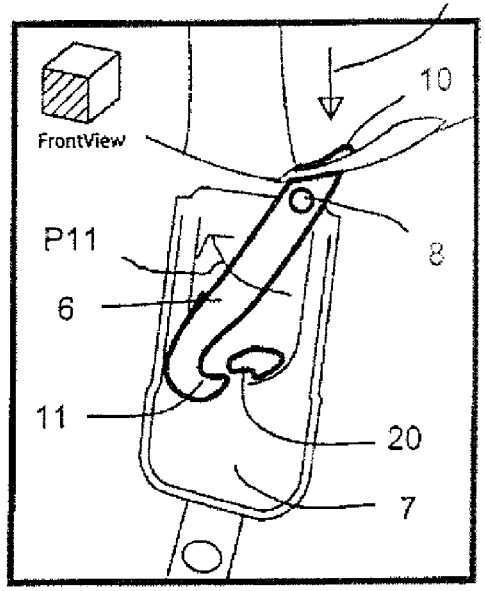

FIGS. 5a and 5b are a perspective side view and a perspective top plan view, respectively, of the second connecting element 7, which is connected to a rod 13 of the frame of the stroller 2. The second connecting element 7 comprises a carrier plate 14 and two side walls 15 extending transversely to the carrier plate 14. The side walls 15 are interconnected at a bottom side by a side wall 16 extending substantially transversely thereto. The carrier plate 14 is furthermore provided with two pawls 17, 18. The first pawl 17 has a downwardly inclined surface 19 and an engagement surface that faces towards the side wall 16. The surfaces 19 and 20 extend transversely to the carrier plate 14.

The second pawl 18 comprises a part 21 that extends conically from the first pawl 17, which part merges into a wall 23 extending substantially transversely to the carrier plate 14 via a sharp transition 22 on a side remote from the first pawl 17. The wall 23 extends substantially vertically.

The operation of the connecting elements 6, 7 will now be discussed in more detail with reference to FIGS. 6a-7b.

Upon placement of the child seat 3 on the stroller 2 forming a chassis, the first connecting elements 6 present on either side of the child seat 3 are placed between the side walls 15 of the second connecting elements 7. During said placement, the underside of the first hook-shaped element 11 slides over the wall part 19, whilst the pivot arm 9 is pivoted in a direction indicated by the arrow P11 against spring force until the hook-shaped element 11 has moved over the entire part 19 and engages the engagement surface 20 of the first hook-shaped element 17 under spring force. The first connecting element 6 is now interlocked with the second connecting element 7 by the first hook-shaped element 11, which is in engagement with the engagement surface 20. The child seat 3 is now securely connected to the stroller 2 and cannot undesirably become detached therefrom.

When a user wishes to remove the child seat 3 from the stroller 2, for example for using the child seat 3 as a separate child seat or using it in a vehicle, for example a car, the user will take hold of the carrying handle 5 with one hand. The user will push the control knob 10 in the direction indicated by the arrow P1 (see FIGS. 1 and 7b) with the other hand, causing the pivot arm 9 to pivot in the direction indicated by the arrow P11 about the pivot axis 8, resulting in the first hook-shaped element 11 being disconnected from the engagement surface 20. During said pivoting of the pivot arm 9 about the pivot axis 8, the pivot arm 9 will also rotate in the direction indicated by the arrow P12 about a vertically extending axis of rotation. Said rotation takes place in that the pivot arm 9 is moved over the conically extending part 21. The pivot arm 9 is pivoted in the direction indicated by the arrows P11, P12 until the rib 12 is located beyond the transition 22 of the conically extending part 21 and is moved in the opposite direction of the arrow P12 under spring force, with the rib 12 abutting against the wall 23. The pivot arm 9 now takes up a blocking position, in which the pivot arm 9 of the first pawl 17 of the second connecting element 7 is unlocked.

After the pivot arm 9 located on one longitudinal side of the child seat 3 has been unlocked and blocked, the user will operate the pivot arm 9 located on the other longitudinal side by moving the control knob 10 in the direction indicated by the arrow P2. After the rib 12 of this pivot arm 9 has been moved into engagement with the associated wall 23 as well, the child seat 3 can be lifted from the stroller 2 in the direction indicated by the arrow P3.

If the control knob 10 is depressed only little, so that the rib 12 is not moved past the transition 22 of the conically extending part 21, the first hook-shaped element 11 of the pivot arm 9 will be moved into engagement with the engagement surface 20 again under spring force.

The pivot arm 9 is pivotable in the direction indicated by the arrow P11 about the pivot axis 8 with some play, as a result of which the pivot arm 9 is at the same time rotatable in the direction indicated by the arrow P12 through an angle large enough for moving the pivot arm 9 over the conically extending part 21.

The invention claimed is:

1. An assembly comprising a chassis and a child seat being detachably connectable to the chassis, which child seat includes at least one first connecting element, which is detachably connectable to a second connecting element included in the chassis, the connecting elements including a locking mechanism for interlocking the connecting elements, which locking mechanism is configured to disconnect the connecting elements from each other, wherein the locking mechanism is placed in a blocking position and the locking mechanism is unlocked and
    wherein the at least one first connecting element includes a pivot arm, which pivot arm includes a first and a second hook-shaped element, which hook-shaped elements mate, respectively, with a first and a second pawl of the second connecting element, and further wherein the first hook-shaped element is connectable to the first pawl for placing the pivot arm in a locked position and the second hook-shaped element is connectable to the second pawl for placing the pivot arm in the blocking position.

2. The assembly according to claim 1, wherein the child seat includes first connecting elements located on two longitudinal sides, and the chassis includes two spaced-apart second connecting elements which are configured to be connected to the two first connecting elements, and each of the two locking mechanisms are configured to be locked in the blocking position.

3. The assembly according to claim 1, wherein a portion of the second pawl has a conical shape.

4. The assembly according to claim 1, wherein the pivot arm is pivotable about a substantially horizontally extending pivot axis for connecting the pivot arm to the first and is also movable to the blocking position.

5. The assembly according to claim 3, wherein the pivot arm is pivotable about a substantially horizontally extending pivot axis for connecting the pivot arm to the first pawl, and it is also pivotable about a substantially vertically extending second pivot axis for moving the pivot arm to the blocking position.

6. The assembly according to claim 1, wherein the chassis is a stroller.

7. A child restraint comprising
a child seat provided with a first locking element and
a second locking element associated with a chassis and configured to mate with the child seat to support the child seat on the chassis, wherein
the first locking element includes a pivot arm mounted for pivotable movement about a first pivot axis between a seat-locking position, a seat-releasing position, and a blocking position, a first hook-shaped element coupled to the pivot arm to move therewith, and a second hook-shaped element coupled to the pivot arm to move therewith,
the second locking element includes a carrier plate, a first pawl coupled to the carrier plate and arranged to mate with the first hook-shaped element of the first locking element upon movement of the pivot arm relative to the carrier plate to the seat-locking position to interlock the first and second locking elements to connect the child seat securely to the chassis, and a second pawl coupled to the carrier plate and formed to include a retainer wall arranged to mate with the second hook-shaped element of the first locking element upon movement of the pivot arm relative to the carrier plate to the blocking position to retain the pivot arm in the blocking position in which the first hook-shaped element is separated and disengaged from the first pawl to free the first locking element of the child seat to be separated from the second locking element of the chassis, and
the first locking element further includes a control knob coupled to the pivot arm and configured to provide means for moving the pivot arm relative to the second locking element from the seat-locking position in which the first hook-shaped element engages the first pawl, through the seat-releasing position in which the first hook-shaped element disengages the first pawl and the second hook-shaped element disengages the second pawl, to the blocking position in which the second hook-shaped element engages the retainer wall of the second pawl.

8. The child restraint of claim 7, wherein the second pawl further includes an inclined ramp having a low end located near the carrier plate and a high end coupled to the retainer wall and arranged to lie in spaced-apart relation to the carrier plate and the inclined ramp is configured to provide means for intercepting the second hook-shaped element during movement of the pivot arm away from the seat-locking position and guiding the second hook-shaped element to mate with the retainer wall of the second pawl upon arrival of the pivot arm at the lock-blocking position.

9. The child restraint of claim 8, wherein the inclined ramp is a section of a cone.

10. The child restraint of claim 7, wherein the pivot arm is L-shaped and includes a short leg and a relatively longer long leg coupled to the short leg at the first pivot axis, the control knob is coupled to the short leg, and each of the first and second hook-shaped elements are coupled to the long leg.

11. The child restraint of claim 10, wherein the second hook-shaped element is arranged to lie in spaced-apart relation to the first pawl and the first hook-shaped element is arranged to lie between the second hook-shaped element and the first pawl.

12. The child restraint of claim 7, wherein the first pawl includes a downwardly inclined surface arranged to face toward the second pawl and to terminate at an engagement surface arranged to mate with the first hook-shaped element upon arrival of the pivot arm at the seat-locking position.

13. The child restraint of claim 12, wherein the second pawl further includes an inclined ramp having a low end located near the carrier plate and a high end coupled to the retainer wall and arranged to lie in spaced-apart relation to the carrier plate and the inclined ramp is configured to provide means for intercepting the second hook-shaped element during movement of the pivot arm away from the seat-locking position and guiding the second hook-shaped element to mate with the retainer wall of the second pawl upon arrival of the pivot arm at the lock-blocking position and the downwardly inclined surface of the first pawl is arranged to face toward the inclined ramp of the second pawl.

14. The child restraint of claim 13, wherein the inclined ramp is a section of a cone.

15. The child restraint of claim 12, wherein the second pawl further includes an inclined ramp having a low end located near the carrier plate and a high end coupled to the retainer wall and arranged to lie in spaced-apart relation to the carrier plate and the inclined ramp is configured to provide means for intercepting the second hook-shaped element during movement of the pivot arm away from the seat-locking position and guiding the second hook-shaped element to mate with the retainer wall of the second pawl upon arrival of the pivot arm at the lock-blocking position, and the inclined ramp of the second pawl is arranged to lie between the downwardly inclined surface of the first pawl and the retainer wall of the second pawl.

16. The child restraint of claim 14, wherein the inclined ramp is a section of a cone.

17. The child restraint of claim 7, wherein the second hook-shaped element is arranged to lie in spaced-apart relation to the first pawl and the first hook-shaped element is arranged to lie between the second hook-shaped element and the first pawl.

18. The child restraint of claim 17, wherein the second pawl further includes an inclined ramp having a low end located near the carrier plate and a high end coupled to the retainer wall and arranged to lie in spaced-apart relation to the carrier plate and the inclined ramp is configured to provide means for intercepting the second hook-shaped element during movement of the pivot arm away from the seat-locking position and guiding the second hook-shaped element to mate with the retainer wall of the second pawl upon arrival of the pivot arm at the lock-blocking position and a portion of the pivot arm arranged to lie between the first and second hook-shaped elements is arranged to lie above and face toward the inclined ramp of the second pawl.

* * * * *